United States Patent [19]
Hinds et al.

[11] Patent Number: 5,751,941
[45] Date of Patent: May 12, 1998

[54] OBJECT ORIENTED FRAMEWORK FOR TESTING SOFTWARE

[75] Inventors: David Hinds, Wakefield, Mass.; Ana Kapetanakis, Nashua, N.H.; Stephen J. McFarland, Groton, Mass.; Mark C. Campbell, Billerica, Mass.; David S. Levin, Concord, Mass.; David J. Miller, Burlington, Mass.

[73] Assignee: Hewlett-Packard Company, Palo Alto, Calif.

[21] Appl. No.: 627,629

[22] Filed: Apr. 4, 1996

[51] Int. Cl.⁶ .................................................. G06F 11/00
[52] U.S. Cl. .................. 395/183.14; 375/62; 364/267; 364/267.91
[58] Field of Search ............... 395/183.14, 183.01, 395/183.03, 183.08, 183.22, 62, 65; 364/267, 267.91, 580, 232.3, 264

[56] References Cited

U.S. PATENT DOCUMENTS

| | | | |
|---|---|---|---|
| 5,414,836 | 5/1995 | Baer et al. | 395/183.14 |
| 5,490,249 | 2/1996 | Miller | 395/183.14 |
| 5,590,330 | 12/1996 | Coskun et al. | 395/704 |
| 5,615,333 | 3/1997 | Juettner et al. | 395/183.14 |
| 5,634,002 | 5/1997 | Polk et al. | 395/183.14 |
| 5,634,098 | 5/1997 | Janniro et al. | 395/183.14 |

OTHER PUBLICATIONS

"The Common Object Request Broker: Architecture (CORBA) and Specification", Revision 2.0 Jul. 1995, pp. 1-1 through 1-8, Object Management Group (OMG), 492 Old Connecticut Pass, Framingham, MA 01701.

"What is the Test Environment Toolkit (TET)", http://tetworks.xopen.org/, X/Open Company Limited, 1010 El Camino Real, Suite 380, Menlo Park, California 94025.

"X/OPEN Company Overview", http://www.xopen.org/, X/Open Company Limited, 1010 El Camino Real, Suite 380, Menlo Park, California 94025.

Robert Hood et al., Accommodating Heterogeneity in a Debugger A Client-Server Approach, Conference dated 3-6 Jan. 1995, IEEE pp. 252-253.

*Primary Examiner*—Robert W. Beausoliel, Jr.
*Assistant Examiner*—Dieu-Minh Le

[57] ABSTRACT

A software testing system tests software. The software testing system includes a set-up and control system, and one or more test systems connected to the set-up and control system. The set-up and control system includes a user interface for interacting with a user of the software testing system. The set-up and control system stores test data and test configurations. Each test system sets up test cases from the test data and the test configurations stored in the set-up and control system. Each test case inherits attributes from at least one test object within the test system. The inherited attributes facilitates the interaction of the test system with the test cases.

22 Claims, 4 Drawing Sheets

OBJECT ORIENTED FRAMEWORK FOR TESTING SOFTWARE

BACKGROUND

The present invention concerns testing software programs and pertains particularly to the use of an object oriented framework for testing software programs and/or objects.

Software testing systems are used to test software quality and reliability as a software project is developed. Often the software testing system is redesigned or replaced when work begins on a new project or a new version of the same software because the software testing system is too tightly coupled to the system under test.

Sometimes the software to be tested is distributed on computers over a heterogeneous network using multiple network transport protocols. This requires manual coding in the test environment to handle a particular situation.

Standardized test environments, such as the Test Environment Toolkit(TET),provide a standardized programming interface for the test environment. For information on TET contact X/Open Company Limited, 1010 El Camino Real, Suite 380, Menlo Park, Calif. 94025, or see the internet at http://tetworks.xopen.org/.

Standardized test environments, such as TET, help to reduce costly retooling by providing a standard application program interface (API) and tool base that developers can adopt and use to write standard tests. However, such test environments are generally not flexible enough to accommodate new software technologies and thus to remain viable over the long term. In addition, the use of currently available standardized test environments is visible (not encapsulated) and intrusive into the system under test.

Additionally, currently available standardized test environments are difficult to install, set up, run, and clean up. Engineering co-op students or other less experienced personnel often operate the test systems. The tests may not be run correctly, or experienced engineers may have to spend time helping the test system operators. The operators require training in how to operate the system properly.

Additionally, tests which run under current standardized test environments written by software developers must be ported to the test environment by specially trained test engineers because the existing systems are intrusive and require knowledge of their operation to be effective. This work is time consuming. Code to coordinate with the test environment must be inserted into the test, possibly changing the test's original intent and functioning. The coordination code may vary somewhat from test to test, meaning that the tests do not behave consistently in the test environment. Changes to the test environment require changes to test environment code contained within every test, requiring much time and effort by an experienced test engineer.

Sometimes it is useful to have multiple, closely related tests. Such a test group must be manually developed and coded. Variations among tests may be buried in the body of each test. These variations may be hard to locate, hard to debug, and hard to maintain by test engineers who did not originally develop the tests.

SUMMARY OF THE INVENTION

In accordance with the preferred embodiment of the present invention, a software testing system tests software. The software testing system includes a set-up and control system, and one or more test systems connected to the set-up and control system. The set-up and control system includes a user interface for interacting with a user of the software testing system. The set-up and control system stores test data and test configurations.

Each test system sets up test cases from the test data and the test configurations stored in the set-up and control system. Each test case inherits attributes from at least one test object within the test system. The inherited attributes facilitates the interaction of the test system with the test cases.

In the preferred embodiment, various objects are used to implement the set-up and control system. For example, a test suite configurator communicates test configuration information to the test systems. To do this, the test suite configurator accesses the test data and the test configurations stored by the set-up and control system. Also, a test controller controls tests which are run on the test system. A system controller receives requests from the user interface and manages activities of the test suite configurator and the test controller. Also, the system controller manages the activities of a data base controller.

The test system is also implemented using various objects. For example, a logger object, which is derived from the database controller, forwards results of testing to the database. A host daemon manages activities within the test system. A test executor starts test cases and reports status of the test cases to the host daemon.

In the preferred embodiment, each test case includes a test case factory, and at least one client test case and/or a server test case. The client test case inherits attributes from a client test object and the server test case inherits attributes from a server test object.

The present invention provides an object-oriented testing environment that is flexible and can test software based on new object-oriented technologies or based on other technologies. Since the invention is object-oriented it is more compatible with object-oriented software to be tested, and object-oriented tests can be written and incorporated into the test environment more easily.

The present invention provides an approach that allows for easy installation, setup, run and clean up. This approach allows less experienced test system operators to run the test system with less training and/or less intervention by experienced test engineers.

The use of inheritance minimizes the porting time for code to be tested, avoids inserting test environment code into the body of the tested code itself, and helps to insure that the test code remains true to its original function.

The use of inheritance also allows test coordination code for many test cases to be written once and inherited by all, thus insuring that each test behaves consistently in the test environment. Changes can be made to the test environment without changing test coordination code in each test case. Additionally, test groups can be developed quickly. Variations between each test can be highlighted (as functionality added by a separate derived class for each separate test case). The test group can be more easily maintained and/or expanded by test engineers who did not write the original tests.

DESCRIPTION OF THE PREFERRED EMBODIMENT

Figure 1:
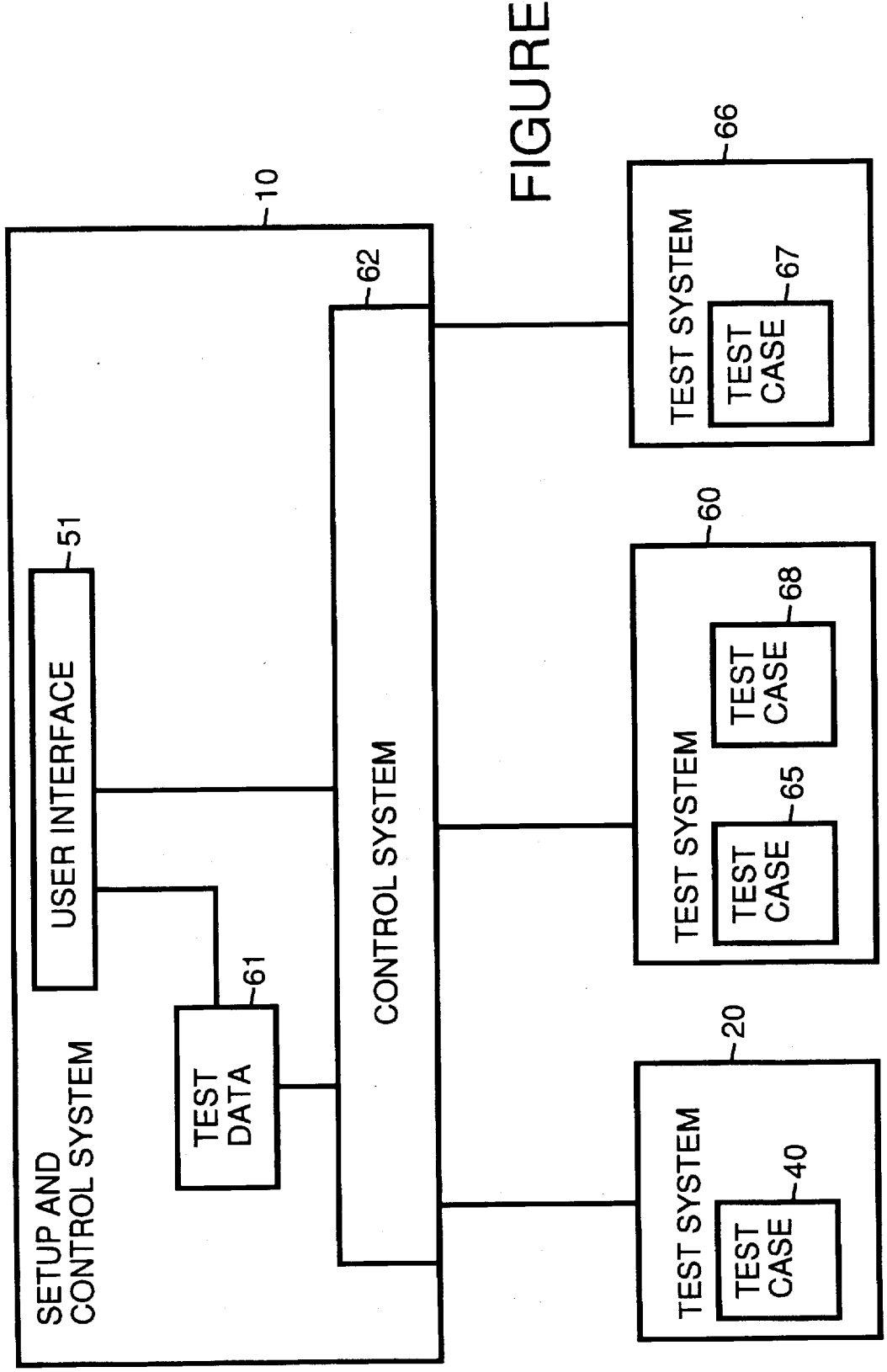
FIG. 1 is a simplified block diagram of an object testing framework in accordance with a preferred embodiment of the present invention.

FIG. 1 is a simplified block diagram of an object testing framework (OTF) in accordance with a preferred embodiment of the present invention. The object testing framework includes a setup and control system 10 and one or more test systems. For example FIG. 1 shows a test system 20, a test system 60 and a test system 66. A control system 62 coordinates testing performed by the test systems. Control system 62 coordinates tests based on test data 61. Test data 61 includes both the programs to be tested as well as configuration suites which indicate what tests will be performed on which test systems. A user interface object 51 provides a single user interface for the object testing framework.

The object testing framework is implemented using object-oriented programming. Object-oriented programming is a set of techniques for creating objects and assembling them into a system that provides a desired functionality. An object is a software model composed of data and operations. An object's operations are used to manipulate its data. Objects may model things such as queues, stacks, windows or circuit components. When assembled into a system, the objects function as delegators, devices, or models. Messages are passed between the objects to produce the desired results.

The eventual goal of object-oriented programming is to reduce the cost of software development by creating reusable and maintainable code. This is achieved by using three features of object-oriented programming: encapsulation, polymorphism, and inheritance. Encapsulation consists of data abstraction and data hiding. Data abstraction is a process of isolating attributes or qualities of something into an object model. With data hiding an object may contain its own private data and methods, which it uses to perform its operations. By using polymorphism, an object's operation may respond to many different types of data (e.g., graphical and textual). Finally, using inheritance, an object can inherit attributes from other objects. The object may then only need to add the attributes, methods, and data structures that make it different from the object from which it inherited its basic characteristics.

One important aspect of object-oriented design, or any software design, is deciding who (i.e., module or object) is responsible for doing what. In the design stage for the preferred embodiment, index cards are used to represent object classes. The index cards are called CRC (class, responsibility, and collaboration) cards. The information on one of these cards includes the name of the class being described, a description of the problem the class is supposed to solve, and a list of other classes that provide services needed by the class being defined. For information on CRC cards see, for example, K. Beck et al, *A Laboratory for Teaching Object-Oriented Thinking*, SIGPLAN Notices, Vol. 24, no. 10, October 1989. For general information on object-oriented modeling and design, see, J. Rumbaugh et al. *Object-Oriented Modeling and Design*, Prentice Hall, 1991.

The object testing framework provides an object-oriented testing environment that is flexible and can test software based on new object-oriented technologies or based on other technologies. Since the object testing framework is object-oriented it is more compatible with object-oriented software to be tested, and object-oriented tests can be written and incorporated into the test environment more easily.

Tests written by software developers and others are encapsulated into test case objects within each test system. For example a test case 40 is shown within test system 20, a test case 65 and a test case 68 is shown within test system 60 and a test case 67 is shown within test system 66. The use of test case objects minimizes the porting time and avoids inserting test environment code into the body of the test itself, helping to insure that the test remains true to its original function.

Test coordination code is encapsulated in a common test object. Having the test coordination code in one place insures that each test behaves consistently in the test environment. Changes can be made to the test environment by changing the common test object and without changing test coordination code in each test case object.

Test groups can be developed quickly. Variations between each test can be highlighted (as functionality added by a separate derived class for each separate test case). The test group can be more easily maintained and/or expanded by test engineers who did not write the original tests.

Figure 2:
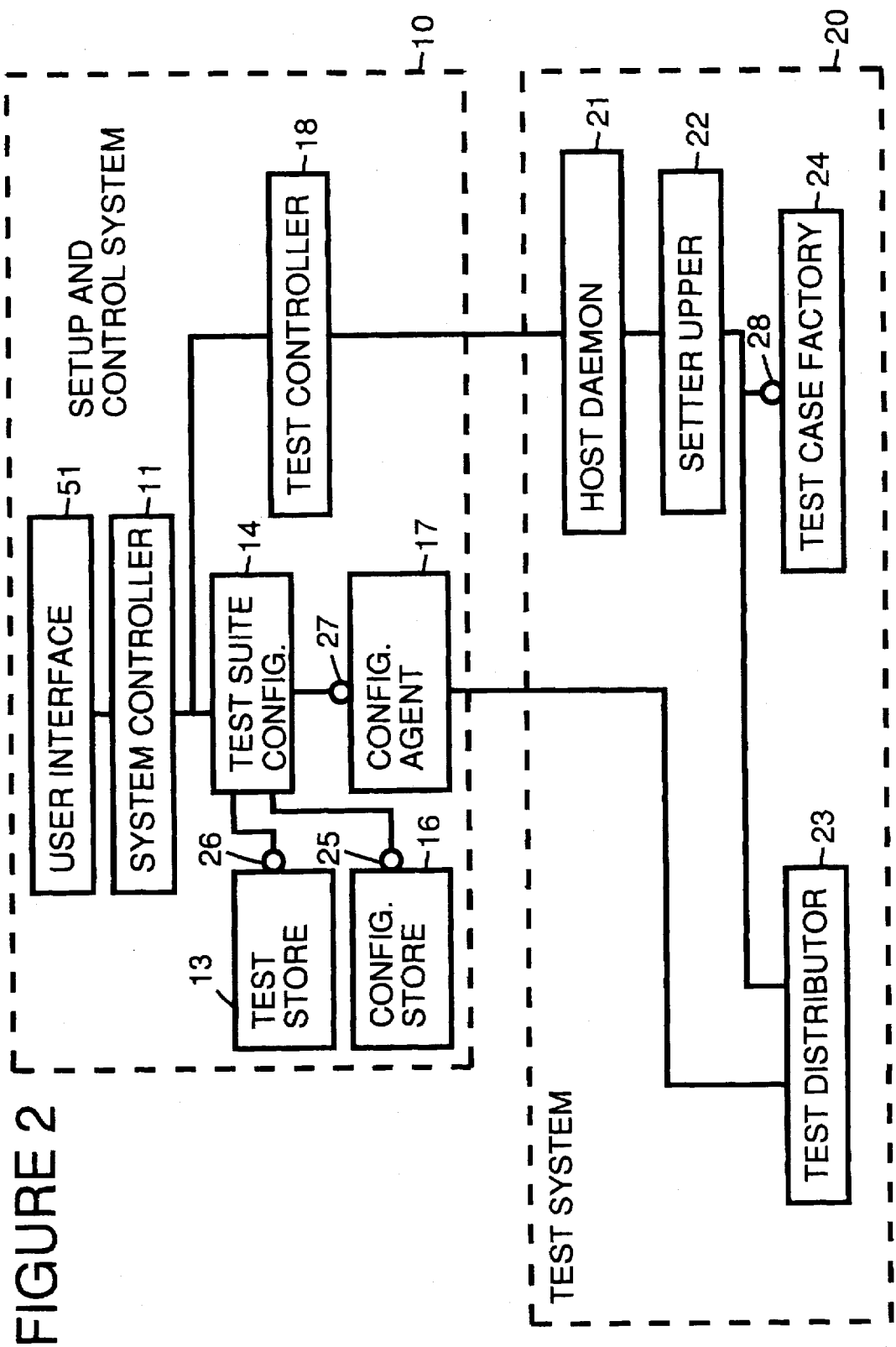
FIG. 2 is a simplified block diagram which shows additional details of the object testing framework shown in FIG. 1 in accordance with a preferred embodiment of the present invention.

FIG. 2 is a simplified block diagram of the object testing framework (OTF) which shows basic coordination between setup and control system 10 and test system 20. Setup and control system 10 is shown to include a system controller object 11, a test controller object 18 and a test suite configuration object 14.

For each test system, test suite configurator object 14 accesses a test store object, a configuration store object and a configuration agent. For example, in FIG. 2, setup and control system 10 is shown to include a test store object 13, a configuration store object 16 and a configuration agent object 17 for test system 20. Test store object 13 is used to access the persistent storage that describes the software to be tested on test system 20. Configuration store object 16 is used to access the persistent storage that describes configuration information for tests to be run, including on test system 20. As indicated by connectors 25, 26 and 27, test suite configuration object 14 may be connected to more than one test store object, configuration store object and configuration agent.

Test system 20 includes, for example, a host daemon object 21, a setter upper object 22 and a test distributor object 23. These entities control tests which are performed by test system 20. There may be one or more tests run simultaneously by test system 20. Each test case object may include, for example, a test case factory, one or more client test cases and/or one or more server test cases. For example, in FIG. 2 a test case factory object 24 is shown. A connector 28 indicates that there may be more than one test case factory within test system 20. For more information on the nature of factories, client objects and server objects see, for example, "The Common Object Request Broker: Architecture (CORBA) and Specification", Revision 2.0 Jul 1995, available from Object Management Group (OMG) having headquarters at 492 Old Connecticut Pass, Framingham, Mass. 01701.

Figure 3:
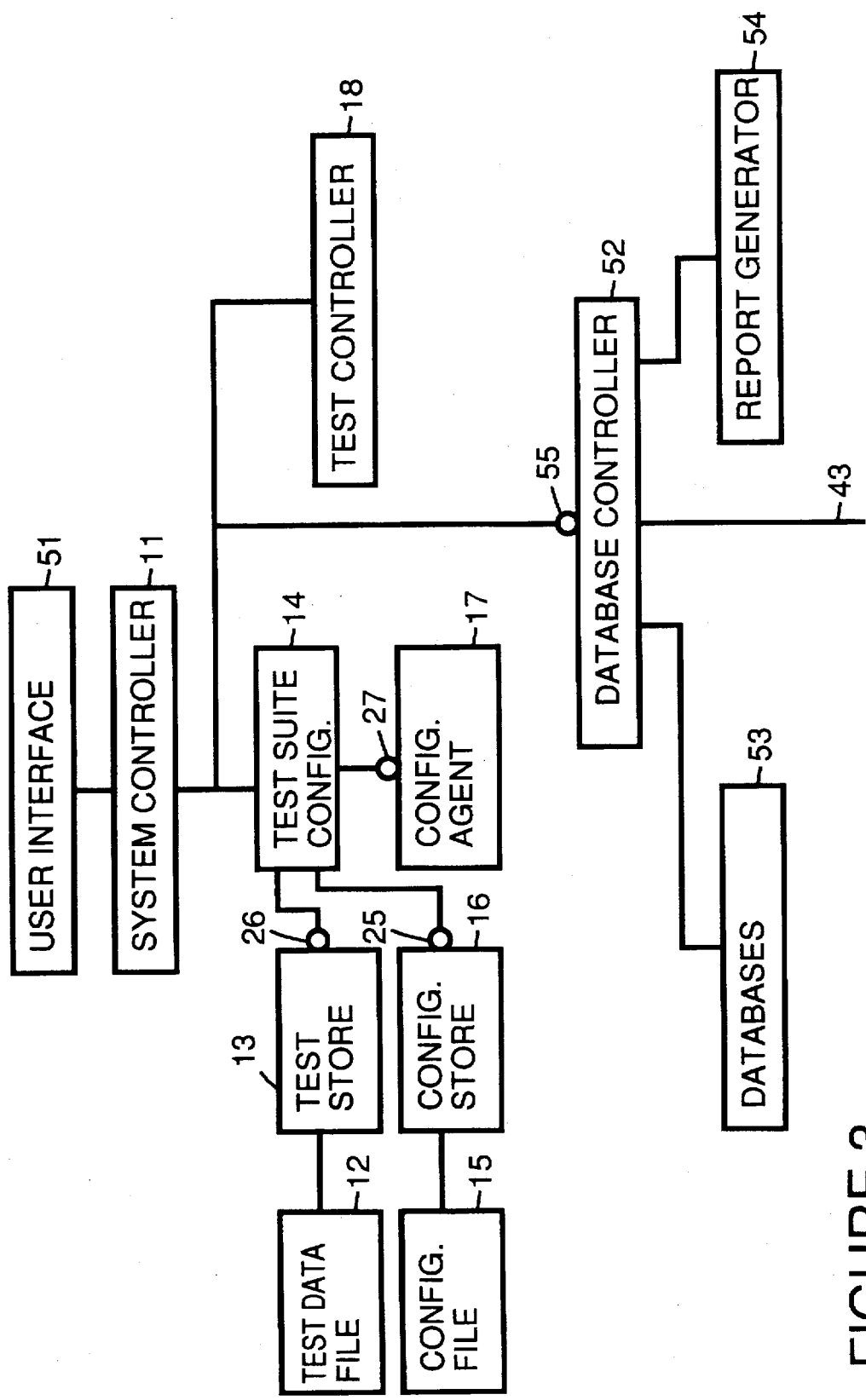
FIG. 3 is a simplified block diagram which shows additional detail of a setup and control system portion of the object testing framework shown in FIG. 1 in accordance with a preferred embodiment of the present invention.

FIG. 3 shows additional detail of setup and control system 10. Additionally shown in FIG. 3 as part of setup and control system 10 are user interface object 51, a database controller object 52, databases 53 and a report generator object 54. As illustrated by connector 55, system controller object 11 may be connected to more than one database controller. Association path 43 shows there is an inheritance of database controller object 52 to test system 20, as is further shown by FIG. 4.

User interface object 51 provides a single user interface for the object testing framework. Through user interface object 51, a user of the OTF specifies test configurations such as which client and server programs will be running on which test system 20. Setup and control system 10 takes the specified configurations and makes them available to each test system, ensures that each test system runs the specified tests, logs test data and results, and generates test reports.

System controller object 11 serves as a delegator object. System controller object 11 takes requests from user interface object 51 and manages the activities of test suite configuration object 14, test controller object 18, and database controller object 52. Test suite configuration object 14 is created by system controller object 11. For a new configuration, test suite configuration object 14 will initialize from configuration data, as provided by user interface object 51. For a previously specified configuration, the object will initialize from information obtained from test store object 13 and configuration store object 16. After configuration data has been set for test suite configuration object 14, the primary responsibility of test suite configuration object 14 is to respond to configuration queries through the test systems. For example configuration queries from test system 20 come through configuration agent object 17.

Test controller object 18 has the overall responsibility for coordinating the running of tests on test system 20. Test controller object 18 provides test system 20 with a pointer to configuration agent object 17 and to test suite configuration object 14, synchronizes the starting of tests, and passes status data and requests back to system controller object 11. Test controller object 18 also has the capability to direct system controller object 11 to log status data to databases 53 via database controller object 52.

Report generator object 54, upon a request from system controller object 11, queries database controller object 52 to assemble, filter, and format test data into user-specified test reports. Raw test data is put into databases 53 by each test system. For example, test system 20 puts raw test data into databases 53 using association path 43.

Figure 4:
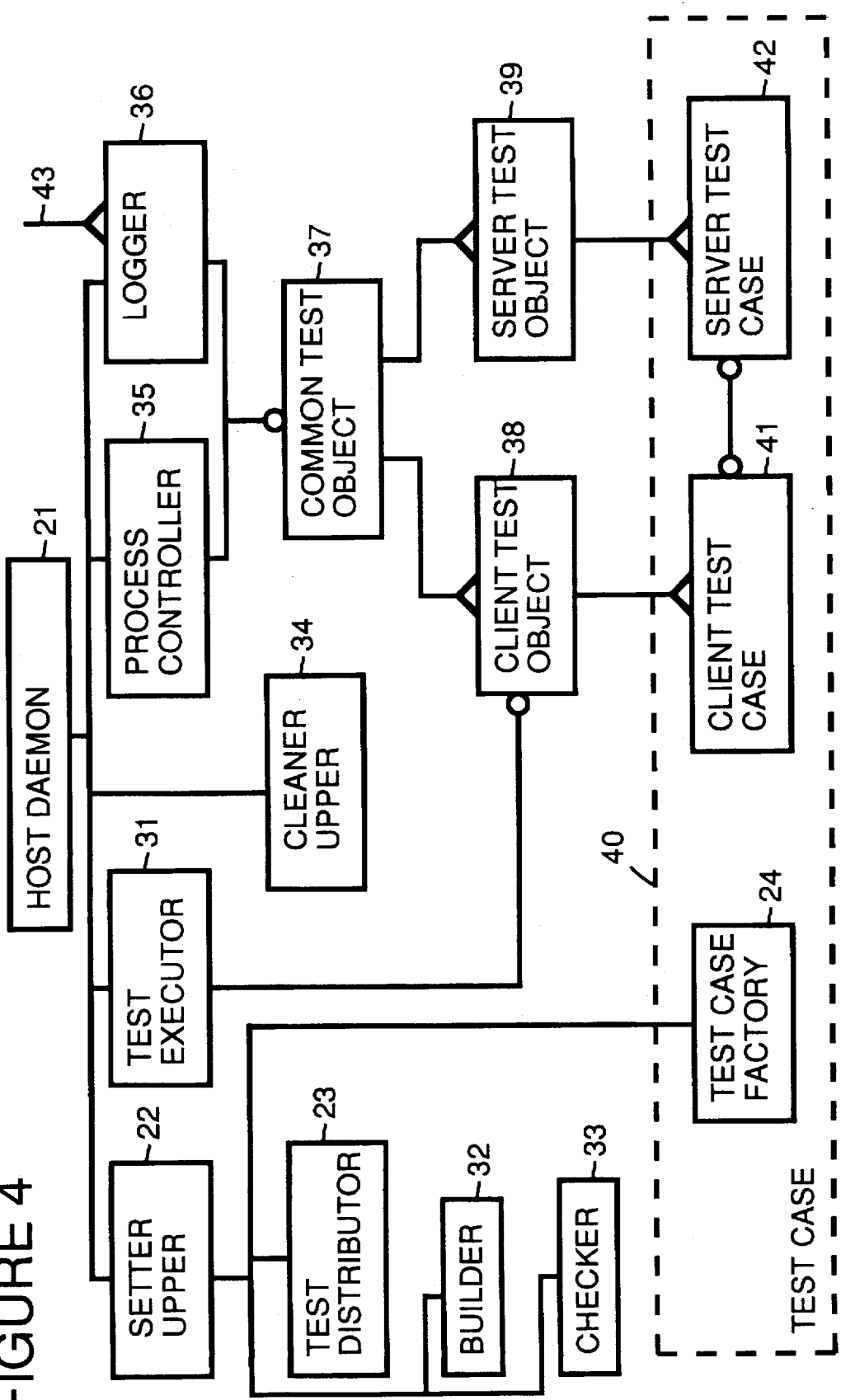
FIG. 4 is a simplified block diagram which shows additional detail of a test system portion of the object testing framework shown in FIG. 1 in accordance with a preferred embodiment of the present invention.

FIG. 4 shows additional detail of test system 20. Additionally shown in FIG. 4 as part of test system 20 is a test executor object 31, a builder object 32, a checker object 33, a cleaner upper object 34, a process controller object 35 and a logger object 36. Association path 43 is shown connected to logger object 36.

For each test case object, a test case factory and various client test cases and/or server test cases can exist. For example, in FIG. 4, a test case 40 is shown to include a test case factory object 24, a client test case object 41 and a server test case object 42. Each client test case inherits attributes of a client test object. The inherited attributes allow the client test case to interact within the test environment. Likewise, each server test case inherits attributes of a server test object. The inherited attributes allow the server test case to interact within the test environment. For example, in FIG. 4, client test case object 41 is shown to inherit attributes of a client test object 38. Server test case object 42 is shown to inherit attributes of a server test object 39. Attributes which are common to clients and servers are inherited from a common test object. For example, in FIG. 4, client test object 38 inherits attributes from a common test object 37 and server test object 39 inherits attributes from common test object 37. In the preferred embodiment, when a user of the OTF prepares programs for testing, the user provides for the inheritance of attributes by including within the header section of the source code for the programs to be tested, references to particular client test objects and/or server test objects. Test system 20, when constructing the tests, will then provide the appropriate inheritances.

In normal operation, test system 20 retrieves configuration data from setup and control system 10 (See FIG. 2), and then, based on that data, retrieves the specified tests from setup and control system 10. For example, test system 20 builds test executables from source code and executables retrieved from setup and control system 10. Once the test executables are in place and any specified test setup has been completed, test system 20 waits for a request from setup and control system 10 to start the tests. When this happens, test system 20 is responsible for running the tests, logging status, test data, and results, and cleaning up upon test completion.

The main object in test system 20 is host daemon object 21 (See FIG. 2), which is the delegator object for test system 20. Host daemon object 21 takes requests from and forwards requests to setup and control system 10 and manages the activities of setter upper object 22, test executor object 31, cleaner upper object 34, process controller object 35, and logger object 36 (See FIG. 4).

The overall responsibility of setter upper object 22, test executor object 31, and cleaner upper object 34 is to manage how the tests are run. These three objects collaborate with builder object 32, test distributor object 23, checker object 33 to form a test management subsystem. Process controller object 35 and logger object 36 provide the infrastructure for connecting the tests to the framework. Process controller object 35 and logger object 36 collaborate to form a process management subsystem.

The test management subsystem sets up and executes the tests and then cleans up after the tests have completed. Setter upper object 22 is the object that controls test setup. Setter upper object 22 is a low-level delegator that manages the activities of builder object 32, test distributor object 23, checker object 33, and factory text case factory object 24. Test distributor object 23 is responsible for retrieving test executables and sources from setup and control system 10. When setter upper object 22 retrieves source code, builder object 32 is responsible for generating test executables from the source code. How the tests are retrieved depends on the overall system environment and resources available. For example, in one embodiment of the present invention, a distributed file system could be used, in another, the tests could be remote copied from setup and control system 10 to test system 20.

Checker object 33 provides the ability to customize test setup by invoking a user-written program that can ensure that elements outside of the test environment are set up correctly. For example, checker object 33 checks that a distributed environment is running, that a display environment is set correctly, and so on.

Test case factory object 24 provides the setup procedures that arise when testing a distributed object system such as a CORBA based object system. Test case factory object 24 creates the server test case objects and stores references to these objects for use by server and client test case objects.

Test executor object 31 starts the client test case(s) by constructing (instantiating) the client test object. Test executor object 31 also reports back to the host daemon object 21 the success or failure of a test start.

Cleaner upper object 34 cleans up after the tests have completed. This includes, for example, removing temporary files, removing test executables, and so on.

The two main objects in the process management subsystem are process controller object 35 and logger object 36. Process controller object 35 has the overall responsibility to monitor all test related processes on test system 20. Logger object 36 can register or unregister processes, kill processes, and report process status back to host daemon object 21.

Logger object 36 provides methods for logging test data and results. Process controller object 35 provides methods for aborting tests, checking for exceptions, getting environment variables, and so on.

Creating a test involves writing a class that inherits from either the client test case or the server test case base classes. The initialization and setup functionality for the test are included in the test's constructor. The cleanup required when the test is done is included in the destructor.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A software testing system for testing software, the software operating within a computing system, the software testing system comprising:
    a set-up and control system, the set-up and control system including
        a user interface for interacting with a user of the software testing system, and
        storage means, for storing test data and for storing test configurations; and,
    a test system, coupled to the set-up and control system, the test system including:
        testing set-up means for setting up test cases from the test data and the test configurations stored in the storage means, each test case inheriting attributes from at least one test object within the test system, the inherited attributes facilitating interaction of the test system with the test cases.

2. A software testing system as in claim 1 comprising additional test systems coupled to the set-up and control system.

3. A software testing system as in claim 1 wherein the set-up and control system additionally includes:
    a test suite configurator which communicates test configuration information to the test system, the test suite configurator accessing the test data and the test configurations stored in the storage means;
    a test controller which controls tests run on the test system; and,
    a system controller which receives requests from the user interface and manages activities of the test suite configurator and the test controller.

4. A software testing system as in claim 3 wherein the set-up and control system additionally includes:
    a database; and,
    a database controller, the database controller controlling the database, wherein the system controller manages activities of the database controller.

5. A software testing system as in claim 4 wherein the test system additionally includes:
    a logger object for forwarding results of testing to the database.

6. A software testing system as in claim 1 wherein the test system additionally includes:
    a host daemon for managing activities within the test system;
    a test executor means for starting test cases and reporting status of the test cases to the host daemon.

7. A software testing system as in claim 1 wherein each test case includes a test case factory, a client test case and a server test case.

8. A software testing system as in claim 7 wherein the test system additionally includes:
    a client test object; and,
    a server test object;
    wherein the client test case inherits attributes from the client test object and the server test case inherits attributes from the server test object.

9. A method for testing software, the method comprising the following steps:
    (a) storing test data and test configurations within a set-up and control system, including the following substep:
        (a.1) obtaining the test data and test configurations through a user interacting with a user interface of the set-up and control system; and,
    (b) setting up, by a test system which is connected to the set-up and control system, test cases from the test data and the test configurations stored in step (a), including the following substep,
        (b.1) inheriting attributes, by each test case, from at least one test object within the test system, the inherited attributes facilitating interaction of the test system with the test cases.

10. A method as in claim 9 additionally comprising the following step:
    (c) setting up, by a second test system which is connected to the set-up and control system, additional test cases from additional test data and additional test configurations stored in step (a).

11. A method as in claim 9 wherein step (b) additionally includes the following substeps:
    (b.2) communicating test configuration information from the set-up and control system to the test system, including accessing the test data and the test configurations stored in step (a).

12. A method as in claim 9 additionally comprising the following step:
    (c) running the test cases on the test system; and,
    (d) reporting status of the test cases to the set-up and control system.

13. A method as in claim 12 wherein step (d) includes logging results of the testing to a database within the set-up and control system.

14. A method as in claim 9 wherein substep (b.1) includes the following substeps:
    inheriting, by a client test case, attributes from a client test object; and, inheriting, by a server test case, attributes from a server test object.

15. Storage media which stores a software testing system for testing software, the software testing system comprising:
    a set-up and control system, the set-up and control system including,
        a user interface for interacting with a user of the software testing system, and storage means, for storing test data and for storing test configurations; and, a test system, coupled to the set-up and control system, the test system including, testing set-up means for setting up test cases from the test data and the test configurations stored in the storage means, each test case inheriting attributes from at least one test object within the test system, the inherited attributes facilitating interaction of the test system with the test cases.

16. Storage media as in claim 15 wherein the software testing system comprises additional test systems coupled to the set-up and control system.

17. Storage media as in claim 15 wherein the set-up and control system additionally includes:

a test suite configurator which communicates test configuration information to the test system, the test suite configurator accessing the test data and the test configurations stored in the storage means;

a test controller which controls tests run on the test system; and, a system controller which receives requests from the user interface and manages activities of the test suite configurator and the test controller.

18. Storage media as in claim 17 wherein the set-up and control system additionally includes:

a database; and, a database controller, the database controller controlling the database, wherein the system controller manages activities of the database controller.

19. Storage media as in claim 18 wherein the test system additionally includes:

a logger object for forwarding results of testing to the database.

20. Storage media as in claim 15 wherein the test system additionally includes:

a host daemon for managing activities within the test system; and, a test executor means for starting test cases and reporting status of the test cases to the host daemon.

21. Storage media as in claim 15 wherein each test case includes a test case factory, a client test case and a server test case.

22. Storage media as in claim 21 wherein the test system additionally includes:

a client test object; and, a server test object;

wherein the client test case inherits attributes from the client test object and the server test case inherits attributes from the server test object.

* * * * *